(12) United States Patent
Bruno et al.

(10) Patent No.: US 10,604,263 B2
(45) Date of Patent: Mar. 31, 2020

(54) MIXING BLEED AND RAM AIR USING A DUAL USE TURBINE SYSTEM

(71) Applicant: Hamilton Sundstrand Corporation, Charlotte, NC (US)

(72) Inventors: Louis J. Bruno, Ellington, CT (US); Harold W. Hipsky, Willington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 373 days.

(21) Appl. No.: 15/604,455

(22) Filed: May 24, 2017

(65) Prior Publication Data
US 2017/0341761 A1 Nov. 30, 2017

Related U.S. Application Data
(60) Provisional application No. 62/341,878, filed on May 26, 2016.

(51) Int. Cl.
| | | |
|---|---|---|
| *B64D 13/04* | (2006.01) | |
| *B64D 13/08* | (2006.01) | |
| *B64D 13/06* | (2006.01) | |

(52) U.S. Cl.
CPC ............ *B64D 13/04* (2013.01); *B64D 13/06* (2013.01); *B64D 13/08* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC ..... F04D 27/005; F04D 27/009; B64D 13/04; B64D 13/06; B64D 13/08; B64D 2013/0688; B64D 2013/0648; B64D 2013/0618; Y02T 50/56
See application file for complete search history.

(56) References Cited

U.S. PATENT DOCUMENTS

| | | | |
|---|---|---|---|
| 2,800,002 | A | 7/1957 | Seed |
| 3,428,242 | A | 2/1969 | Rannenberg |
| 4,021,215 | A | 5/1977 | Rosenbush |

(Continued)

FOREIGN PATENT DOCUMENTS

| | | |
|---|---|---|
| CA | 2968745 A1 | 11/2017 |
| EP | 1112930 A2 | 7/2001 |

(Continued)

OTHER PUBLICATIONS

European Office Action for European Application No. 17172757.1 dated Nov. 30, 2018; 6 Pages.

(Continued)

*Primary Examiner* — Brian P Wolcott
(74) *Attorney, Agent, or Firm* — Cantor Colburn LLP

(57) ABSTRACT

An airplane is provided. The airplane includes a pressurized volume and an air conditioning system. The air conditioning system includes a compressor configured to receive a flow of a first medium, a turbine downstream of the compressor in a flow path of the first medium, a first valve that diverts the flow of the first medium around the turbine, a second valve that provides a second medium to the turbine, and a third valve downstream of the turbine that directs an outlet flow of the turbine towards the pressurized volume and that directs the outlet flow of the turbine away from the pressurized volume.

11 Claims, 9 Drawing Sheets

(56) References Cited

U.S. PATENT DOCUMENTS

| | | | |
|---|---|---|---|
| 4,261,416 A | 4/1981 | Hamamoto | |
| 4,374,469 A | 2/1983 | Rannenberg | |
| 4,604,028 A | 8/1986 | Yeaple et al. | |
| 5,299,763 A * | 4/1994 | Bescoby | B64D 13/06 244/118.5 |
| 5,461,882 A | 10/1995 | Zywiak | |
| 5,473,899 A | 12/1995 | Viteri | |
| 5,899,085 A | 5/1999 | Williams | |
| 5,911,388 A | 6/1999 | Severson et al. | |
| 5,967,461 A | 10/1999 | Farrington | |
| 6,199,387 B1 | 3/2001 | Sauterleute | |
| 6,257,003 B1 | 7/2001 | Hipsky | |
| 6,505,474 B2 | 1/2003 | Sauterleute et al. | |
| 6,519,969 B2 | 2/2003 | Sauterleute | |
| 6,526,775 B1 * | 3/2003 | Asfia | B64D 13/06 62/402 |
| 6,615,606 B2 | 9/2003 | Zywiak | |
| 6,681,592 B1 | 1/2004 | Lents et al. | |
| 6,776,002 B1 | 8/2004 | Ho | |
| 6,845,630 B2 | 1/2005 | Bruno | |
| 6,848,261 B2 * | 2/2005 | Claeys | B64D 13/06 62/259.2 |
| 7,222,499 B2 | 5/2007 | Hunt | |
| 7,607,318 B2 | 10/2009 | Lui et al. | |
| 7,624,592 B2 | 12/2009 | Lui et al. | |
| 7,950,606 B2 | 5/2011 | Atkey et al. | |
| 8,042,354 B1 | 10/2011 | Dziorny et al. | |
| 8,099,973 B2 | 1/2012 | Sampson et al. | |
| 8,302,407 B2 | 11/2012 | Alecu | |
| 8,985,966 B2 | 3/2015 | Sampson et al. | |
| 9,109,514 B2 | 8/2015 | Cheong | |
| 9,169,024 B2 | 10/2015 | Voinov | |
| 9,211,954 B2 * | 12/2015 | Barkowsky | B64D 13/06 |
| 9,481,468 B1 | 11/2016 | Schiff | |
| 9,555,893 B2 * | 1/2017 | Squier | B64D 13/08 |
| 9,849,990 B2 * | 12/2017 | Bruno | F02C 6/08 |
| 10,059,458 B2 | 8/2018 | Squier | |
| 10,137,993 B2 | 11/2018 | Bruno et al. | |
| 10,144,517 B2 | 12/2018 | Bruno et al. | |
| 10,232,948 B2 | 3/2019 | Bruno et al. | |
| 2001/0004837 A1 | 6/2001 | Sauterleute | |
| 2003/0051500 A1 | 3/2003 | Asfia | |
| 2003/0126880 A1 | 7/2003 | Zywiak | |
| 2004/0014418 A1 | 1/2004 | Farag et al. | |
| 2004/0014419 A1 * | 1/2004 | Lents | B64D 13/06 454/237 |
| 2004/0055309 A1 | 3/2004 | Bellows | |
| 2006/0059927 A1 | 3/2006 | Zywiak et al. | |
| 2006/0196216 A1 | 9/2006 | Bruno et al. | |
| 2007/0266695 A1 | 11/2007 | Lui et al. | |
| 2009/0117840 A1 | 5/2009 | Kresser | |
| 2009/0317248 A1 | 12/2009 | Tanaka et al. | |
| 2010/0043794 A1 | 2/2010 | Saito et al. | |
| 2010/0323601 A1 | 12/2010 | Cremers et al. | |
| 2012/0118528 A1 | 5/2012 | Al-Ali | |
| 2012/0156027 A1 | 6/2012 | Merritt et al. | |
| 2013/0033348 A1 | 2/2013 | Saito et al. | |
| 2013/0118190 A1 | 5/2013 | Bruno et al. | |
| 2013/0133348 A1 | 5/2013 | Squier | |
| 2013/0136590 A1 | 5/2013 | Higashimori | |
| 2014/0109603 A1 | 4/2014 | Fernandes et al. | |
| 2014/0238043 A1 | 8/2014 | Sokhey et al. | |
| 2014/0353461 A1 | 12/2014 | Vignali et al. | |
| 2015/0013355 A1 | 1/2015 | Klimpel et al. | |
| 2015/0065025 A1 | 3/2015 | Bruno et al. | |
| 2015/0251765 A1 | 9/2015 | Jonqueres et al. | |
| 2015/0251766 A1 | 9/2015 | Atkey | |
| 2015/0275844 A1 | 10/2015 | Winkler et al. | |
| 2015/0307195 A1 | 10/2015 | Bruno | |
| 2015/0329210 A1 | 11/2015 | Bammann | |
| 2016/0083100 A1 | 3/2016 | Bammann | |
| 2017/0021296 A1 | 1/2017 | Paul et al. | |
| 2017/0129614 A1 | 5/2017 | Bammann et al. | |
| 2017/0341759 A1 | 11/2017 | Bruno et al. | |
| 2017/0341760 A1 | 11/2017 | Hall et al. | |
| 2017/0341761 A1 | 11/2017 | Bruno et al. | |
| 2017/0341764 A1 | 11/2017 | Bruno et al. | |
| 2017/0341767 A1 | 11/2017 | Bruno et al. | |
| 2017/0341768 A1 | 11/2017 | Bruno et al. | |
| 2017/0342838 A1 | 11/2017 | Bruno et al. | |
| 2017/0342899 A1 | 11/2017 | Bruno et al. | |
| 2018/0051945 A1 | 2/2018 | Hanov et al. | |
| 2018/0057175 A1 | 3/2018 | Klimpel et al. | |

FOREIGN PATENT DOCUMENTS

| | | |
|---|---|---|
| EP | 1129941 A2 | 9/2001 |
| EP | 1386837 | 2/2004 |
| EP | 2597036 A2 | 5/2013 |
| EP | 2602191 A1 | 6/2013 |
| EP | 2845804 A1 | 3/2015 |
| EP | 2937287 A1 | 10/2015 |
| EP | 2947012 A1 | 11/2015 |
| JP | 5909163 B2 | 4/2016 |
| WO | 03035472 A1 | 5/2003 |
| WO | 2016004021 A1 | 1/2016 |

OTHER PUBLICATIONS

Extended Search Report dated Jun. 7, 2018 in European Patent Application No. 17204787.

Search Report dated Oct. 5, 2017 in European Patent Application No. 17173077.

Search Report dated Oct. 5, 2017 in European Patent Application No. 17172816.

Search Report dated Oct. 6, 2017 in European Patent Application No. 17172822.

Search Report dated Oct. 9, 2017 in European Patent Application No. 17172889.

Search Report dated Oct. 11, 2017 in European Patent Application No. 17172834.

Search Report dated Oct. 20, 2017 in European Patent Application No. 17172830.

Search Report dated Oct. 20, 2017 in European Patent Application No. 17172757.

Search Report dated Oct. 25, 2017 in European Patent Application No. 17173043.

Search Report dated Nov. 2, 2017 in European Patent Application No. 17172891.

Search Report dated Nov. 10, 2017 in European Patent Application No. 17172821.

* cited by examiner

MIXING BLEED AND RAM AIR USING A DUAL USE TURBINE SYSTEM

CROSS-REFERENCE TO RELATED APPLICATION

This application claims benefit of priority to U.S. Provisional Application No. 62/341,878 filed May 26, 2016, the disclosure of which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

BRIEF DESCRIPTION

According to one or more embodiments, an airplane is provided. The airplane includes a pressurized volume; and an air conditioning system comprising: a compressor configured to receive a flow of a first medium, a turbine downstream of the compressor in a flow path of the first medium, a first valve configured to divert the flow of the first medium around the turbine, a second valve configured to provide a second medium to the turbine, and a third valve downstream of the turbine configured to direct an outlet flow of the turbine towards the pressurized volume and to direct the outlet flow of the turbine away from the pressurized volume.

According to one or more embodiments or the above airplane embodiment, the first medium can comprise fresh air.

According to one or more embodiments or any of the above airplane embodiments, the second medium can comprise cabin discharge air.

According to one or more embodiments or any of the above airplane embodiments, the airplane can comprise a second turbine configured to receive a third medium.

According to one or more embodiments or any of the above airplane embodiments, the third medium can comprise bleed air According to one or more embodiments or any of the above airplane embodiments, the first medium can mix with the third medium downstream of the second turbine.

According to one or more embodiments, an airplane is provided. The airplane includes a pressurized volume; and an air conditioning system comprising: a compressor configured to receive a flow of a first medium, a turbine downstream of the compressor in a flow path of the first medium, a first valve configured to divert the flow of the first medium around the turbine and configured to provide a second medium to the turbine, and a second valve downstream of the turbine configured to direct an outlet flow of the turbine towards the pressurized volume and to direct the outlet flow of the turbine away from the pressurized volume.

According to one or more embodiments or the above airplane embodiment, the first medium can comprise fresh air.

According to one or more embodiments or any of the above airplane embodiments, the second medium can comprise cabin discharge air.

According to one or more embodiments or any of the above airplane embodiments, the airplane can comprise a second turbine configured receive a third medium.

According to one or more embodiments or any of the above airplane embodiments, the third medium can comprise bleed air.

According to one or more embodiments or any of the above airplane embodiments, the first medium can mix with the third medium downstream of the second turbine.

According to one or more embodiments, a method of operating a plurality of valves of an air conditioning system to control a plurality of flows of mediums is provided. The method comprises receiving, by a compressor, a flow of a first medium, wherein a turbine downstream of the compressor in a flow path of the first medium; diverting, by a first valve of the plurality of valves, the flow of the first medium around the turbine; providing, by a second valve of the plurality of valves, a second medium to the turbine; directing, by a third valve of the plurality of valves, an outlet flow of the turbine towards a pressurized volume when the air conditioning system is operating in a first mode; and directing, by the third valve of the plurality of valves, an outlet flow of the turbine away from the pressurized volume when the air conditioning system is operating in a second mode.

According to one or more embodiments or the above method embodiment, the first medium can comprise fresh air.

According to one or more embodiments or any of the above method embodiments, the second medium can comprise cabin discharge air.

According to one or more embodiments or any of the above method embodiments, the method can comprise receiving, by a second turbine, a flow of a third medium.

According to one or more embodiments or any of the above method embodiments, the third medium can comprise bleed air.

According to one or more embodiments or any of the above method embodiments, the method can comprise mixing the first medium with the third medium downstream of the second turbine.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high fuel burn efficiency. The medium can generally be air, while other examples include gases, liquids, fluidized solids, or slurries.

Figure 1:
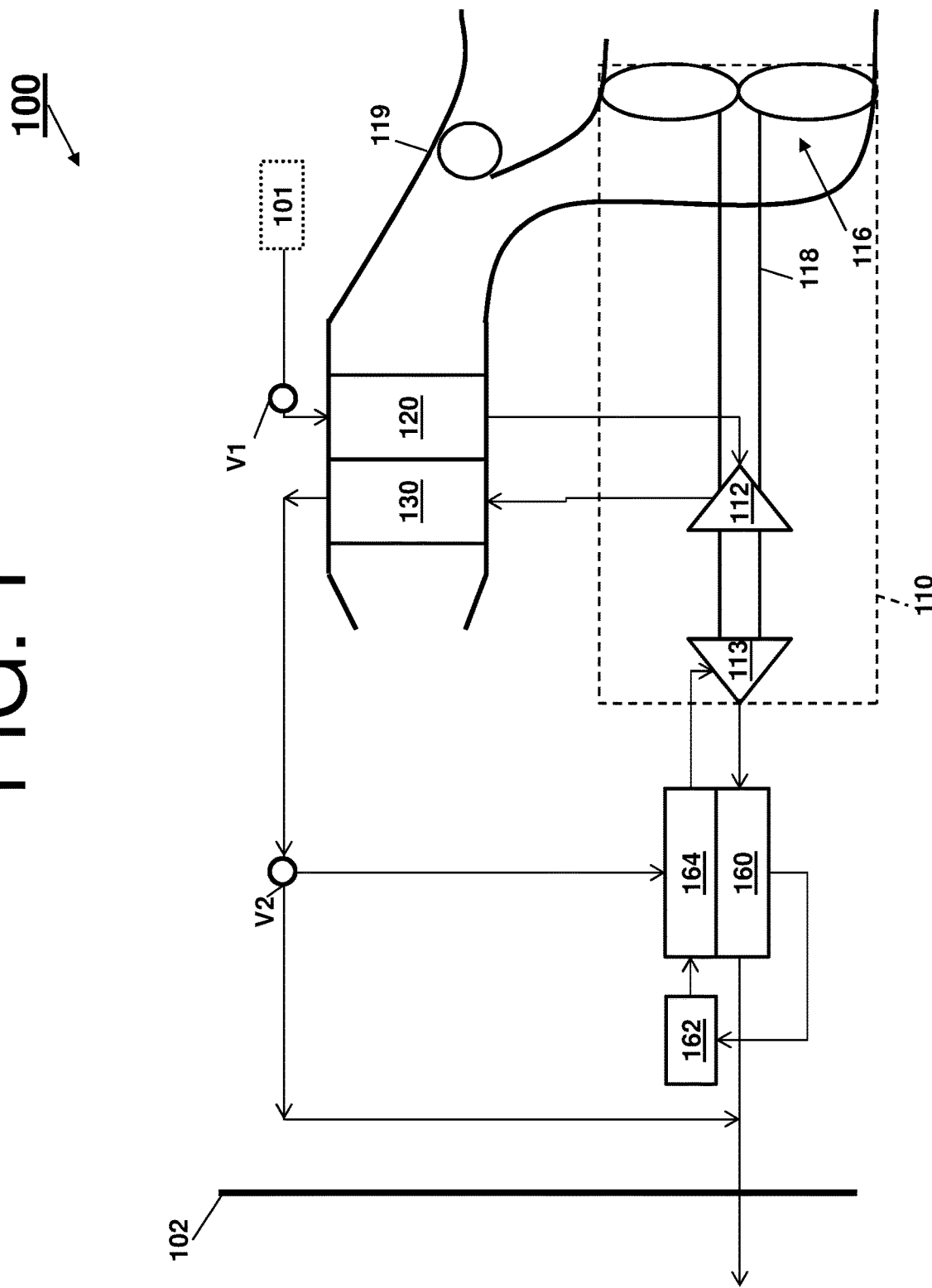
FIG. 1 is a diagram of an schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 113, a fan 116, and a shaft 118. The system 100 also comprises a primary heat exchanger 120, a secondary heat exchanger 130, a condenser 160, a water extractor 162, and a reheater 164.

The compressing device 110 is a mechanical device that includes components for performing thermodynamic work on the medium (e.g., extracts work from or works on the medium by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113.

The turbine 113 is mechanical device that drives the compressor 112 and the fan 116 via the shaft 118. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100. In general, ram air is outside air used as a heat sink by the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 160 and the reheater 164 are particular types of heat exchangers. The water extractor 162 is a mechanical device that performs a process of taking water from the medium. Together, the condenser 160, the water extractor 162, and/or the reheater 164 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A vale V1 (e.g., a mass flow control valve) controls the flow of the medium from the inlet 101 to the system 100. Further, a vale V2 controls whether the flow of the medium from the secondary heat exchanger 130 bypasses the turbine 113 in accordance with a mode of the system 100. A combination of components of the system 100 can be referred to as an air conditioning pack or a pack. The pack can begin at a vale V1 and conclude as air exits the condenser 162.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit). The temperature, humidity, and pressure of the bleed air vary widely depending upon a compressor stage and a revolutions per minute of the turbine engine.

Figure 2:
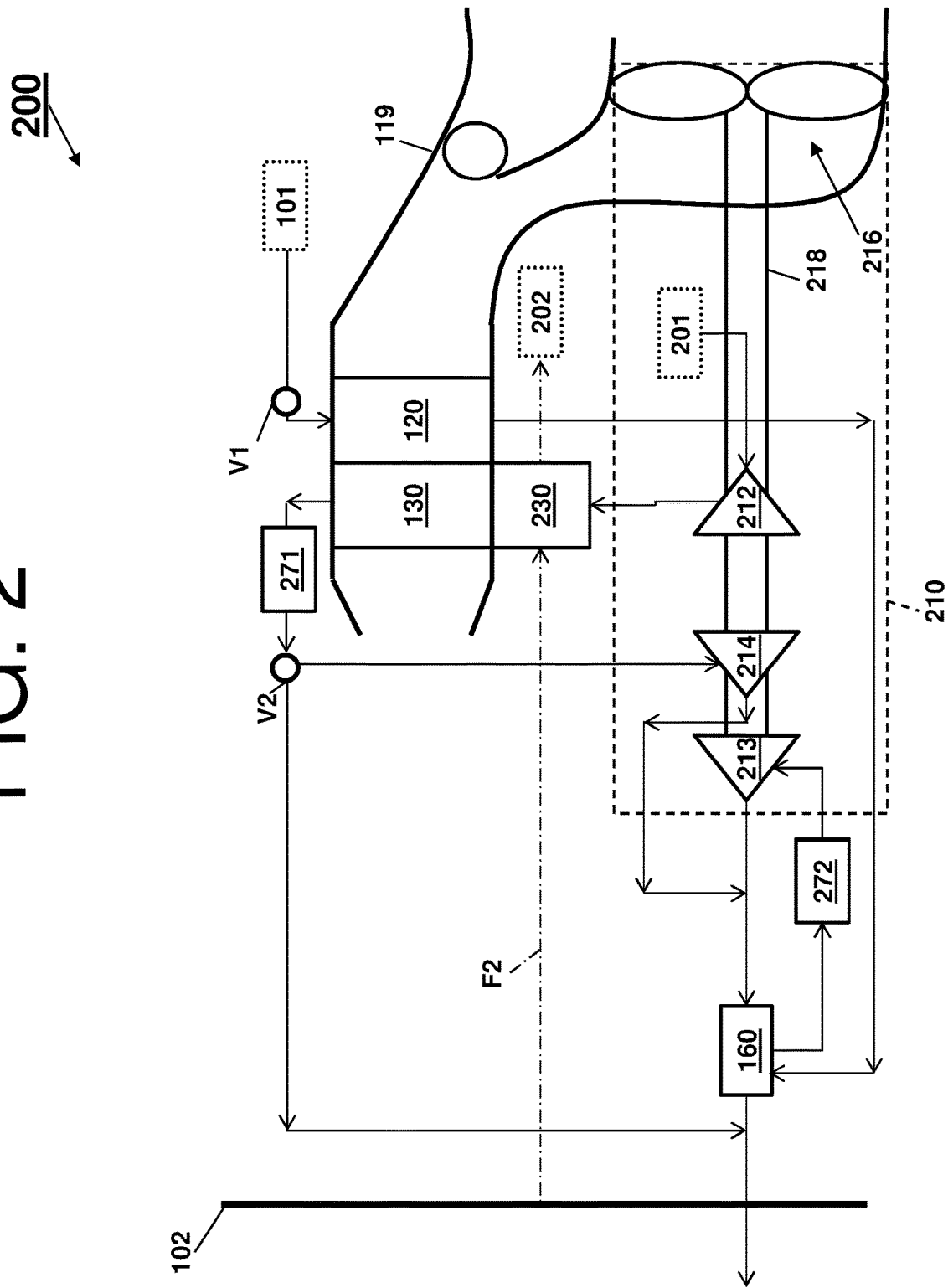
FIG. 2 is operation example of an environmental control system that mixes fresh air with bleed air according to an embodiment.

Turning now to FIG. 2, a schematic of an environmental control system 200 (e.g., an embodiment of system 100), as it could be installed on an aircraft, where in operation the environmental control system 200 mixes fresh air with bleed air, is depicted according to an embodiment. Components of the system 100 that are similar to the environmental control system 200 have been reused for ease of explanation, by using the same identifiers, and are not re-introduced. Alternative components of the environmental control system 200 include a compressing device 210 (that comprises a compressor 212, a turbine 213, a turbine 214, a fan 116, and a shaft 118), an inlet 201, an outlet 202, an outflow valve heat exchanger 230, a water collector 271, and a water collector 272, along with a path for the medium denoted by the dot-dashed line F2 (where the medium can be provided from the chamber 102 into the environmental control system 200).

In view of the above aircraft embodiment, when a medium is being provided from the chamber 102 (e.g., air leaving a pressurized volume, cabin of the aircraft, or cabin and flight deck of the aircraft), the medium can be referred as chamber discharge air (also known as pressured air or cabin discharge air). Note that in one or more embodiments, an exhaust from the environmental control system 200 can be released to ambient air through the shell 119 or sent to the outlet 202 (e.g., a cabin pressure control system).

Further, when a medium is being provided from the inlet 201, the medium can be referred to as fresh outside air (also known as fresh air or outside air destined to enter the pressurized volume or chamber 102). The fresh outside air can be procured by one or more scooping mechanisms, such as an impact scoop or a flush scoop. Thus, the inlet 201 can be considered a fresh air inlet.

In low altitude operation of the environmental control system 200, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 160, where it is further cooled by air from the turbines 213 and 214 of the compressing device 210. Upon exiting the condenser 160, the cool high pressure air enters the water extractor 272 so that moisture in the air is removed.

The cool high pressure air enters the turbine 213 through a nozzle. The cool high pressure air is expanded across the turbine 213 and work extracted from the cool high pressure air. This extracted work drives the compressor 212 used to compress fresh outside air. This extracted work also drives the fan 216, which is used to move air through the primary heat exchanger 120 and the secondary heat exchanger 130 (also known as ram air heat exchangers).

The act of compressing the fresh outside air, heats the fresh outside air. The compressed fresh outside air enters the outflow valve heat exchanger 230 and is cooled by the chamber discharge air to produce cooled compressed fresh outside air. The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air then enters the turbine 214 through a nozzle. The cool medium pressure air is expanded across the turbine 214 and work extracted from the cool medium pressure air. Note that the chamber discharge air exiting from the outflow valve heat exchanger 230 can then be sent to an outlet 202. The outlet 202 can be a cabin pressure control system that utilized the energy of the chamber discharge air.

The two air flows (e.g., the fresh outside air sourcing from 201 and the bleed air sourcing from inlet 101) are mixed downstream of the turbine 213 to produce mixed air. This downstream location can be considered a first mixing point of the environmental control system 200. The mixed air leaves then enters the condenser 160 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 200, the fresh outside air can be mixed downstream of the condenser 160 (rather than downstream of the turbine 213 or at the first mixing point). In this situation, the air exiting the water extractor 271 is the cool medium pressure air. This cool medium pressure air is directed by the valve V2 to downstream of the condenser 160. The location at which this cool medium pressure air mixes with the bleed air, which is sourced from the inlet 101 and exiting the condenser 160, can be considered a second mixing point of the environmental control system 200.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 75% to provide higher efficiencies with respect to engine fuel burn than contemporary airplane air systems.

Figure 3:
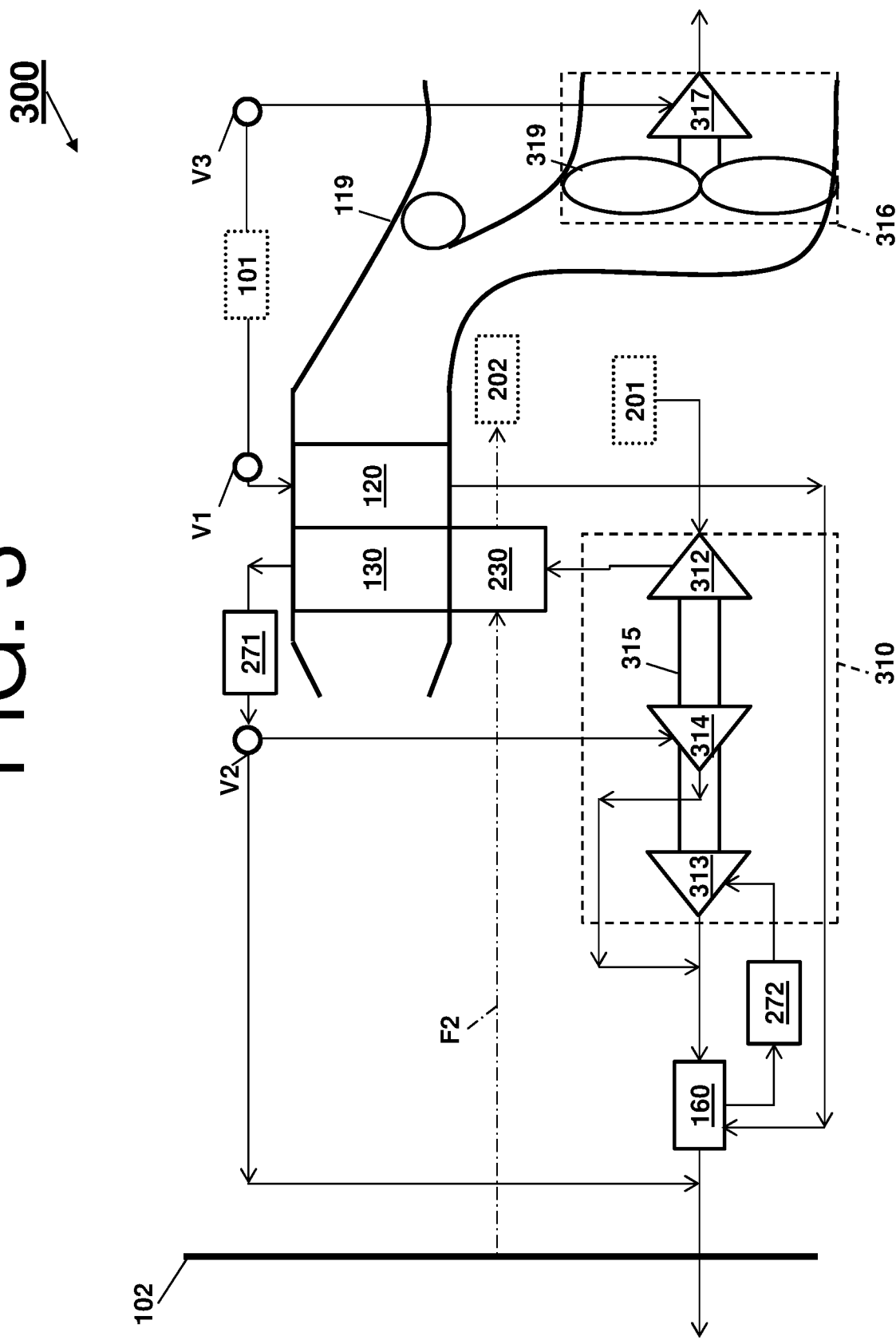
FIG. 3 is operation example of an environmental control system that mixes fresh air with bleed air, where the environmental control system includes a bleed air driven fan, according to an embodiment.
Figure 4:
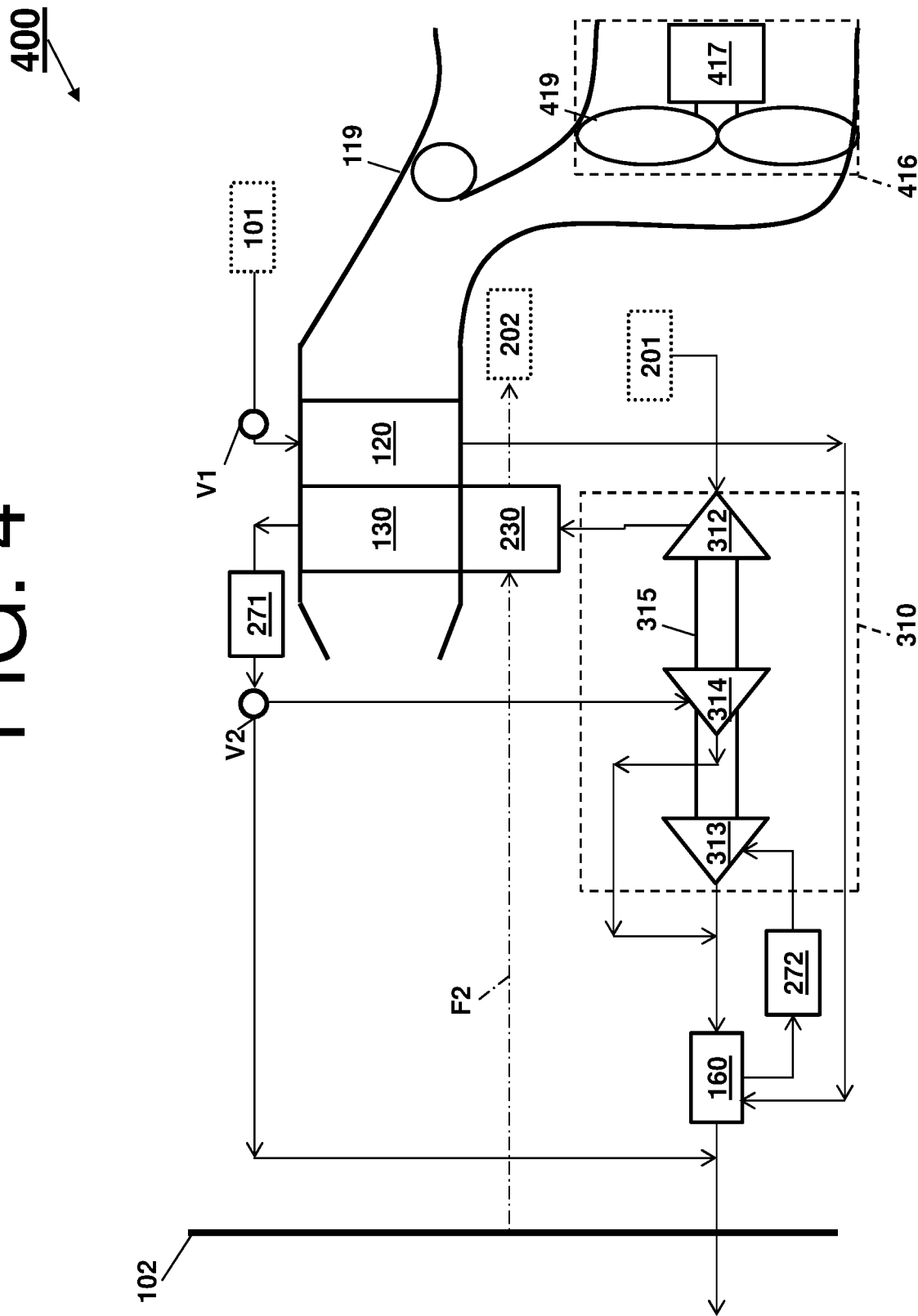
FIG. 4 is operation example of an environmental control system that mixes fresh air with bleed air, where the environmental control system includes an electrically driven fan, according to an embodiment.
Figure 5:
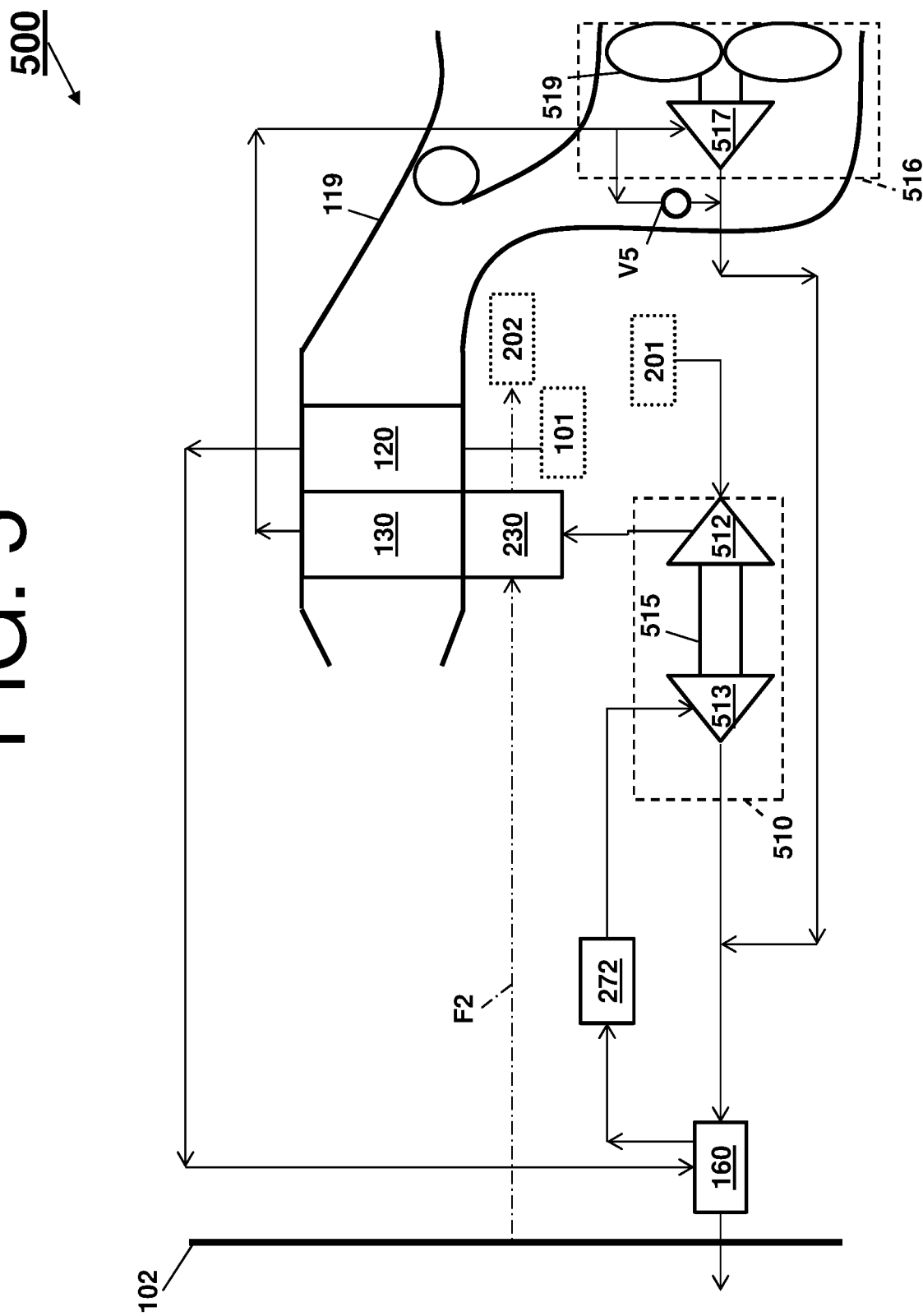
FIG. 5 is operation example of an environmental control system that mixes fresh air with bleed air, where the environmental control system includes a fresh air driven fan, according to an embodiment.

FIGS. 3, 4, and 5 illustrate variations of the environmental control system 200. In general. Turning now to FIG. 3, a schematic of an environmental control system 300 (e.g., an embodiment of the environmental control system 200) is depicted according to an embodiment. Components of the systems 100 and 200 that are similar to the environmental control system 300 have been reused for ease of explanation, by using the same identifiers, and are not re-introduced. Alternative components of the environmental control system 300 include a compressing device 310, which comprises a compressor 312, a turbine 313, a turbine 314, and a shaft 315, and a rotating device 316 (e.g., turbine driven fan), which comprises a turbine 317 and a fan 319, along with a secondary path for the medium sourced from the inlet 101 (e.g., a valve V3 can provide the medium from the inlet 101 to an inlet of the turbine 317).

The environmental control system 300 operates similarly to the environmental control system 200 in that different mixing points are utilized based on the mode of operation. In addition, the environmental control system 300 separates the ram air fan (e.g., fan 116) from the air cycle machine (e.g., the compressing device 110) and provides the ram air fan within the rotating device 316. The turbine 317 of the rotating device 316 is powered by the bleed air sourced from the inlet 101 flowing through the valve V3.

Turning now to FIG. 4, a schematic of an environmental control system 400 (e.g., an embodiment of the environmental control system 200) is depicted according to an embodiment. Components of the systems 100, 200, and 300 that are similar to the environmental control system 400 have been reused for ease of explanation, by using the same identifiers, and are not re-introduced. Alternative components of the environmental control system 400 include a rotating device 416, which comprises a motor 417 and a fan 419.

The environmental control system 400 operates similarly to the environmental control system 200 in that different mixing points are utilized based on the mode of operation. In addition, the environmental control system 400 separates the ram air fan (e.g., fan 116) from the air cycle machine (e.g., the compressing device 110) and provides the ram air fan within the rotating device 416. The motor 417 of the rotating device 416 is powered by electric power.

Turning now to FIG. 5, a schematic of an environmental control system 500 (e.g., an embodiment of the environmental control system 200) is depicted according to an embodiment. Components of the systems 100, 200, 300, and 400 that are similar to the environmental control system 500 have been reused for ease of explanation, by using the same identifiers, and are not re-introduced. Alternative components of the environmental control system 400 include a compressing device 510, which comprises a compressor 512, a turbine 513, and a shaft 515, and a rotating device 516, which comprises a motor 517 and a fan 519. Note that the rotating device 516 is along a path of the medium sourced from the inlet 201, such that the rotating device 516 can be supplied this medium or bypassed.

The environmental control system 500 operates similarly to the environmental control system 200 in that different mixing points are utilized based on the mode of operation. In addition, the environmental control system 500 separates the ram air fan (e.g., fan 116) from the air cycle machine (e.g., the compressing device 110) and provides the ram air fan within the rotating device 516. The turbine 517 of the rotating device 516 is powered by the fresh air sourced from the inlet 201.

Figure 6:
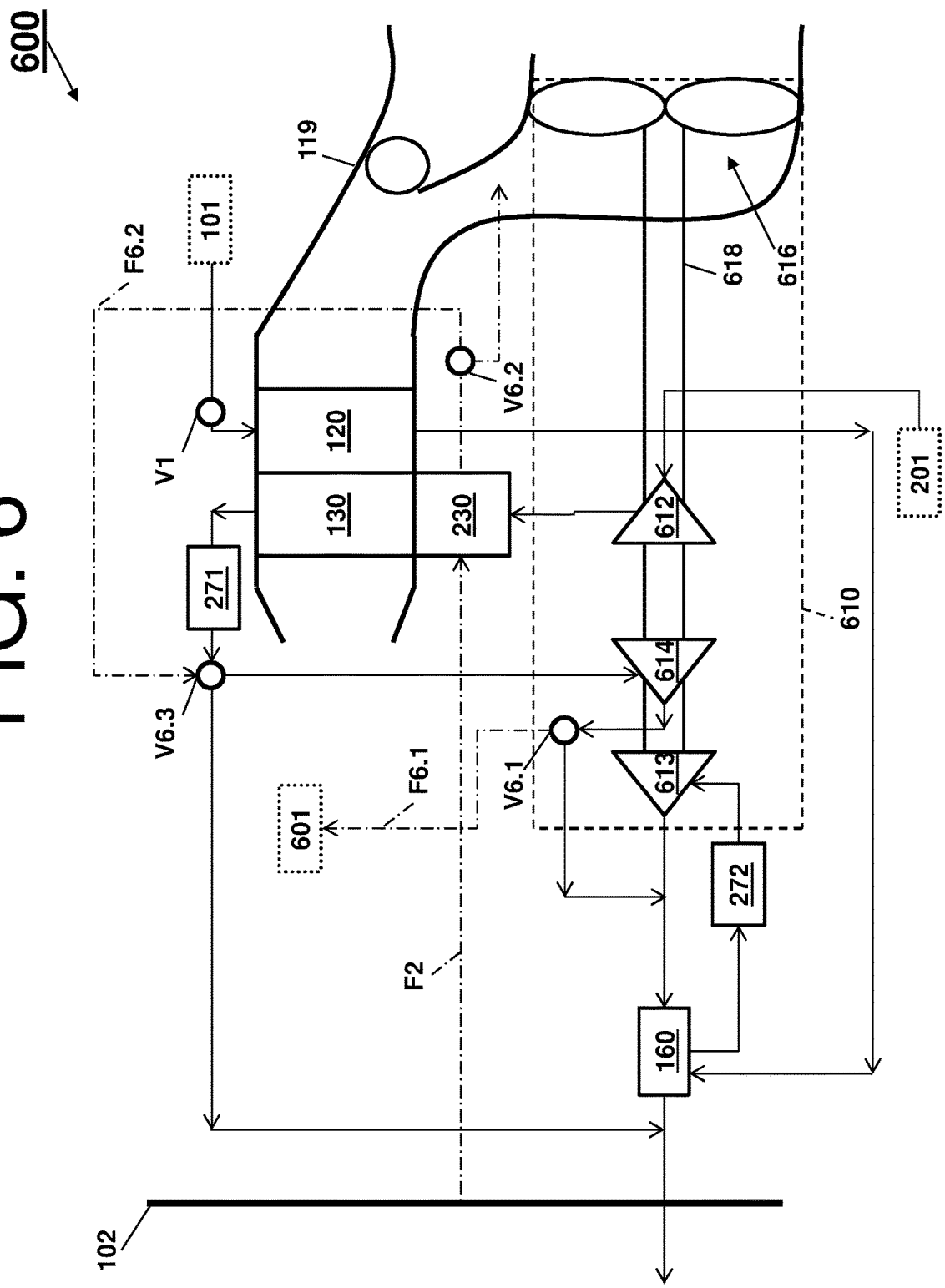
FIG. 6 is operation example of an environmental control system that mixes fresh air with bleed air according to another embodiment.

Turning now to FIG. 6, a schematic of an environmental control system 600 (e.g., an embodiment of system 100), as it could be installed on an aircraft is depicted according to an embodiment. In operation the environmental control system 600 can provide mixed air from any combination of fresh air, bleed air, and cabin discharge air. Components of the systems 100, 200, 300, 400 and 500 that are similar to the environmental control system 600 have been reused for ease of explanation, by using the same identifiers, and are not re-introduced. Alternative components of the environmental control system 600 include an outlet 601 and a compressing device 610 that comprises a compressor 612, a turbine 613, a turbine 614, a fan 616, and a shaft 618. Alternative components of the environmental control system 600 also include valves V6.1, V6.2, and V6.3. A path is further denoted by the dot-dashed line F6.1 for a flow the medium that is controlled by valve V6.1 to the outlet 601 (e.g., which can be overboard). Another path is denoted by the dot-dashed line F6.2 for a flow the medium that is controlled by valve V6.2 for supplying the cabin discharge air to the valve V6.3 (otherwise the cabin discharge air can be directed overboard through the shell 119). Note that the turbine 614 can be a dual use. A dual use turbine is configured to receive flows of different mediums in the alternative In low altitude operation of the environmental control system 600, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 160, where it is further cooled by air from the turbines 613 and 614 of the compressing device 610. Upon exiting the condenser 160, the cool high pressure air enters the water extractor 272 so that moisture in the air is removed.

The cool high pressure air enters the turbine 613 through a nozzle. The cool high pressure air is expanded across the turbine 613 and work extracted from the cool high pressure air. This extracted work drives the compressor 612 used to compress fresh outside air. This extracted work also drives the fan 616, which is used to move air through the primary heat exchanger 120 and the secondary heat exchanger 130.

The act of compressing the fresh outside air, heats the fresh outside air. The compressed fresh outside air enters the outflow valve heat exchanger 230 and is cooled by the chamber discharge air to produce cooled compressed fresh outside air. The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air then enters the turbine 614 through a nozzle. The cool medium pressure air is expanded across the turbine 614 and work extracted from the cool high pressure air.

The two air flows (e.g., the fresh outside air sourcing from 201 and the bleed air sourcing from inlet 101) are mixed downstream of the turbine 613 to produce mixed air. A valve V6.1 can then be used to direct an outlet of the turbine 614 away from the chamber or to downstream of the turbine 613 (to provide the cool medium pressure air exiting the turbine 614 to the first mixing point such that it flows to the chamber 102). This downstream location can be considered a first mixing point of the environmental control system 600. The mixed air leaves then enters the condenser 160 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 600, the fresh outside air can be mixed downstream of the condenser 160 (rather than at the first mixing point). In this situation, the air exiting the water extractor 271 is the cool medium pressure air. This cool medium pressure air is directed by the valve V6.3 to downstream of the condenser 160.

The valve V6.3 can also direct the cabin discharge air to the turbine 614. For instance, energy in the cabin discharge air can be used to power the compressor 612 by feeding (e.g., the dot-dashed line F6.2) the cabin discharge air to the turbine 614. Note that the cabin discharge air enters the turbine 614 through a nozzle such that the turbine 614 expands hot air from the outflow valve heat exchanger 230. The cabin discharge air can continue overboard (e.g., to outlet 601) through valve V6.1. Overboard comprise an ambient pressure at high altitude operation. By the cabin discharge air continuing to overboard, a pressure drop across the turbine 614 is created such that the cabin discharge air is drawn though the turbine 614 (e.g., cabin discharge air pressure is higher than ambient air pressure). In this way, the compressor 612 receives power from both the bleed air (across the turbine 613) and the cabin discharge air (across the turbine 614).

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 60% to provide higher efficiencies with respect to engine fuel burn than contemporary airplane air systems.

Figure 7:
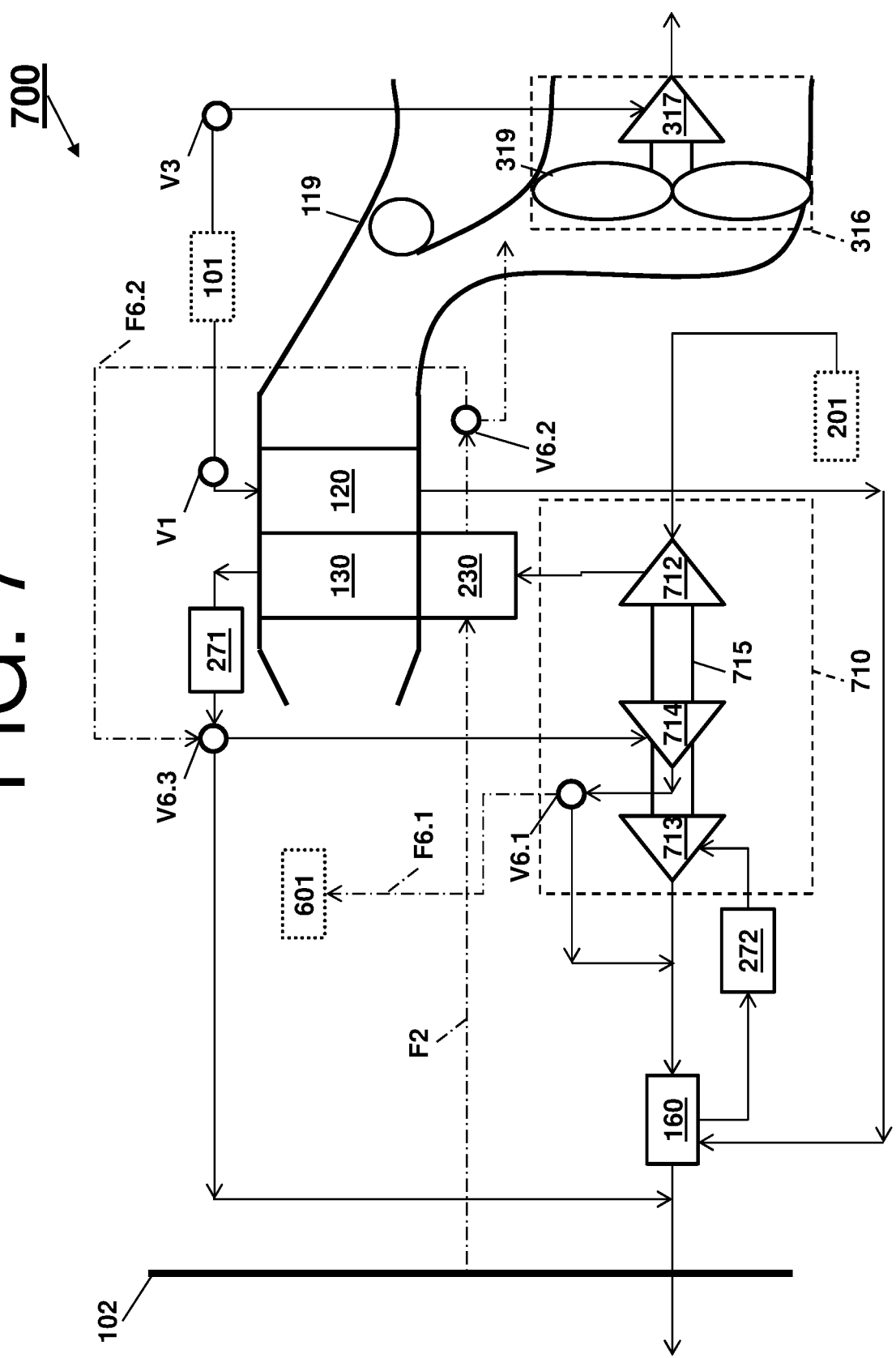
FIG. 7 is operation example of an environmental control system that mixes fresh air with bleed air, where the environmental control system includes a bleed air driven fan, according to another embodiment.
Figure 8:
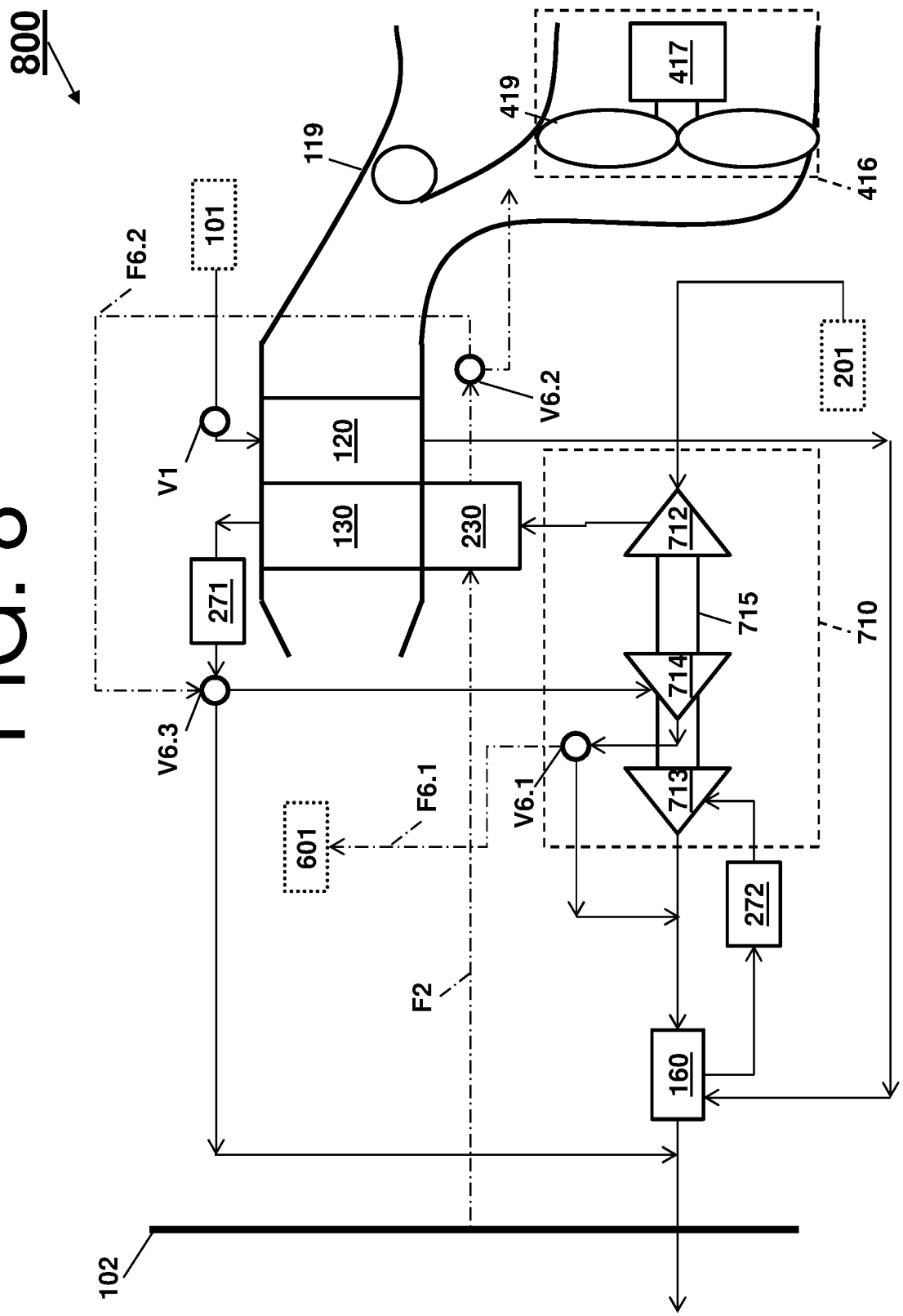
FIG. 8 is operation example of an environmental control system that mixes fresh air with bleed air, where the environmental control system includes an electrically driven fan, according to another embodiment.
Figure 9:
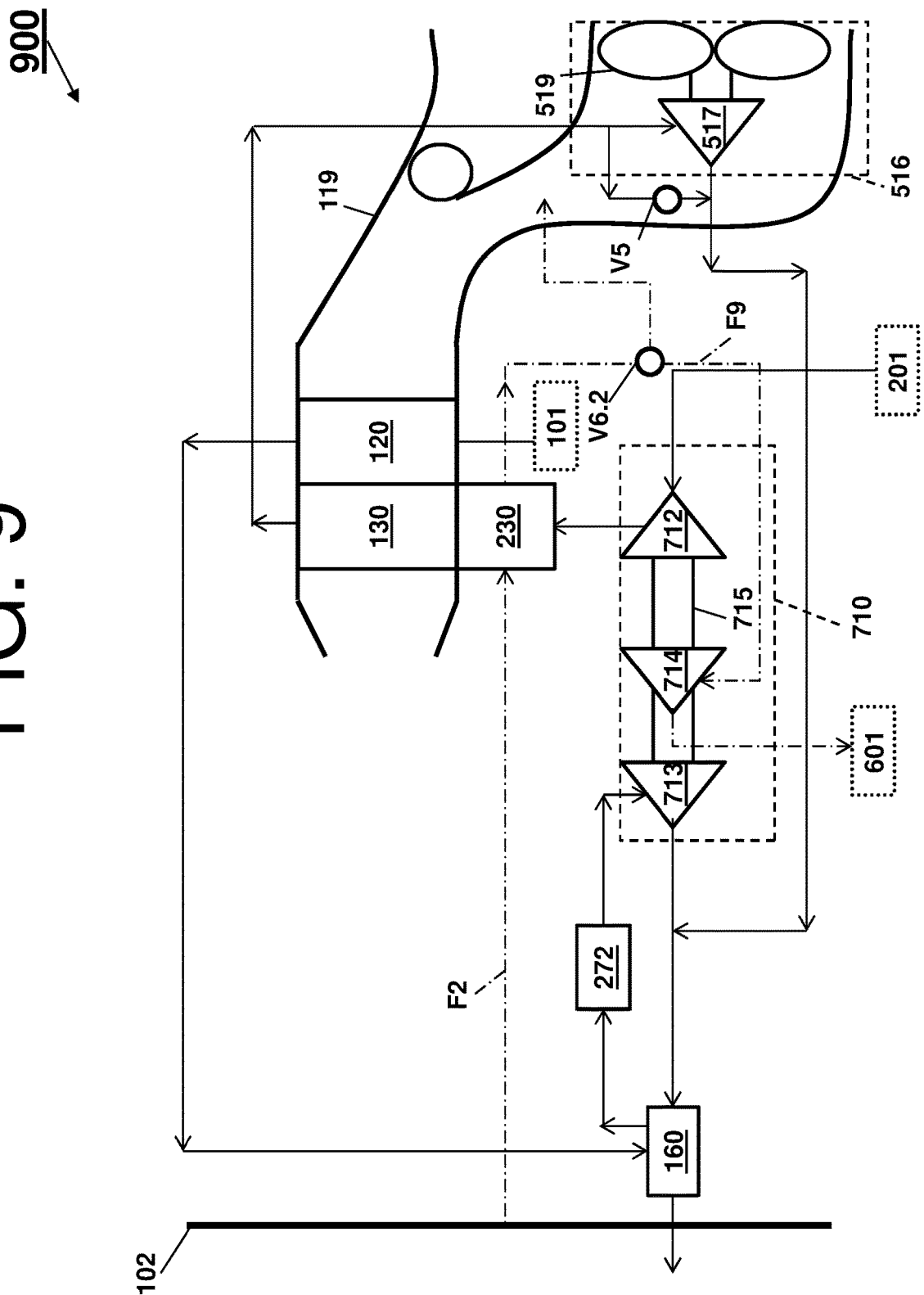
FIG. 9 is operation example of an environmental control system that mixes fresh air with bleed air, where the environmental control system includes a fresh air driven fan, according to another embodiment.

FIGS. 7, 8, and 9 illustrate variations of the environmental control system 600. In general. Turning now to FIG. 7, a schematic of an environmental control system 700 (e.g., an embodiment of the environmental control system 600) is depicted according to an embodiment. Components of the systems 100, 200, 300, 400, 500, and 600 that are similar to the environmental control system 700 have been reused for ease of explanation, by using the same identifiers, and are not re-introduced. Alternative components of the environmental control system 700 include a compressing device 710, which comprises a compressor 712, a turbine 713, a turbine 714, and a shaft 715. Note that the turbine 614 is a dual use.

The environmental control system 700 operates similarly to the environmental control system 600 in that different mixing points are utilized based on the mode of operation. In addition, the environmental control system 700 separates the ram air fan (e.g., fan 116) from the air cycle machine (e.g., the compressing device 110) and provides the ram air fan within the rotating device 316. The turbine 317 of the rotating device 316 is powered by the bleed air sourced from the inlet 101 flowing through the valve V3.

Further, energy in the fresh air exiting from the water extractor 271 can be used to power the compressor 712 by feeding the air exiting the water extractor 271 via the valve V6.3 to the turbine 714. Furthermore, energy in the cabin discharge air exiting from the outflow valve heat exchanger 230 can be used to power the compressor 712 by feeding (e.g., the dot-dashed line F6.2) the cabin discharge air to the turbine 714. In this way, the second turbine 714 can be fed air from the outflow valve heat exchanger 230 (e.g., cabin discharge air) and/or air exiting the water extractor 271 (e.g., fresh outside air), while the first turbine 713 can be fed air from the primary heat exchanger 120 (e.g., bleed air). In turn, the compressor 712 can receive power from the bleed air (via turbine 713), the cabin discharge air (via turbine 714), and/or the fresh outside air (also via turbine 714). Note that the cabin discharge air or the fresh outside air can be mixed with the bleed air downstream of the turbine 713.

Turning now to FIG. 8, a schematic of an environmental control system 800 (e.g., an embodiment of the environmental control system 600) is depicted according to an embodiment. Components of the systems 100, 200, 300, 400, 500, 600, and 700 that are similar to the environmental control system 800 have been reused for ease of explanation, by using the same identifiers, and are not re-introduced.

The environmental control system 800 operates similarly to the environmental control system 600 in that different mixing points are utilized based on the mode of operation. In addition, the environmental control system 800 separates the ram air fan (e.g., fan 116) from the air cycle machine (e.g., the compressing device 110) and provides the ram air fan within the rotating device 416. The motor 717 of the rotating device 716 is powered by electric power.

Turning now to FIG. 9, a schematic of an environmental control system 900 (e.g., an embodiment of the environmental control system 600) is depicted according to an embodiment. Components of the systems 100, 200, 300, 400, 500, 600, 700, and 800 that are similar to the environmental control system 900 have been reused for ease of explanation, by using the same identifiers, and are not re-introduced. Alternative components of the environmental control system 900 include a path for the medium denoted by the dot-dashed line F9 (where the medium can be provided from the chamber 102 to the turbine 714).

The environmental control system 900 operates similarly to the environmental control system 600 in that different mixing points are utilized based on the mode of operation. In addition, the environmental control system 900 separates the ram air fan (e.g., fan 116) from the air cycle machine (e.g., the compressing device 110) and provides the ram air fan within the rotating device 516. The turbine 517 of the rotating device 516 is powered by the fresh air sourced from the inlet 201. Note that the rotating device 516 is along a path of the medium sourced from the inlet 201, such that the rotating device 516 can be supplied this medium or bypassed based on the operation of valve V5. In addition, Note in one or more embodiments, an exhaust from the turbine 714 can be sent to the outlet 601 (e.g., a cabin pressure control system) after the turbine 714 extracts work from the medium received from path F9.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:
1. An airplane comprising:
   a pressurized volume; and
   an air conditioning system comprising:
      a compressor configured to receive a flow of a first medium, wherein the first medium comprises fresh air sourced from a first inlet,
      a turbine downstream of the compressor in a flow path of the first medium,
      a first valve configured to divert the flow of the first medium around the turbine,
      a second valve configured to provide a second medium to the turbine,
      a third valve downstream of the turbine configured to direct an outlet flow of the turbine towards the pressurized volume and to direct the outlet flow of the turbine away from the pressurized volume, and
      a second turbine configured to receive a third medium, wherein the third medium comprises bleed air sourced from a second inlet.

2. The airplane of claim 1, wherein the second medium comprises cabin discharge air.

3. The airplane of claim 1, wherein the first medium mixes with the third medium downstream of the second turbine.

4. The airplane of claim 1, wherein the first inlet comprises a scooping mechanism that procures the fresh air from outside the airplane.

5. The airplane of claim 1, wherein the second inlet comprises a connection that procures the bleed air from a turbine engine or an auxiliary power unit of the airplane.

6. An airplane comprising:
a pressurized volume; and
an air conditioning system comprising:
  a compressor configured to receive a flow of a first medium, wherein the first medium comprises fresh air sourced from a first inlet,
  a turbine downstream of the compressor in a flow path of the first medium,
  a first valve configured to divert the flow of the first medium around the turbine and configured to provide a second medium to the turbine,
  a second valve downstream of the turbine configured to direct an outlet flow of the turbine towards the pressurized volume and to direct the outlet flow of the turbine away from the pressurized volume, and
  a second turbine configured to receive a third medium, wherein the third medium comprises bleed air sourced from a second inlet.

7. The airplane of claim 6, wherein the second medium comprises cabin discharge air.

8. The airplane of claim 7, wherein the first medium mixes with the third medium downstream of the second turbine.

9. A method of operating a plurality of valves of an air conditioning system to control a plurality of flows of mediums, the method comprising:
receiving, by a compressor, a flow of a first medium, wherein a turbine downstream of the compressor in a flow path of the first medium, wherein the first medium comprises fresh air sourced from a first inlet;
diverting, by a first valve of the plurality of valves, the flow of the first medium around the turbine;
providing, by a second valve of the plurality of valves, a second medium to the turbine;
directing, by a third valve of the plurality of valves, an outlet flow of the turbine towards a pressurized volume when the air conditioning system is operating in a first mode; and
directing, by the third valve of the plurality of valves, an outlet flow of the turbine away from the pressurized volume when the air conditioning system is operating in a second mode,
receiving, by a second turbine, a flow of a third medium, wherein the third medium comprises bleed air sourced from a second inlet.

10. The method of claim 9, wherein the second medium comprises cabin discharge air.

11. The method of claim 10, further comprising:
mixing the first medium with the third medium downstream of the second turbine.

* * * * *